US012366832B1

(12) United States Patent
Deng

(10) Patent No.: US 12,366,832 B1
(45) Date of Patent: Jul. 22, 2025

(54) TIMER

(71) Applicant: Shenzhen Weike Brand Management Ltd., Guangdong (CN)

(72) Inventor: Xiaohui Deng, Guangdong (CN)

(73) Assignee: SHENZHEN WEIKE BRAND MANAGEMENT LTD., Guangdong (CN)

( * ) Notice: Subject to any disclaimer, the term of this patent is extended or adjusted under 35 U.S.C. 154(b) by 0 days.

(21) Appl. No.: 19/021,867

(22) Filed: Jan. 15, 2025

(30) Foreign Application Priority Data

Sep. 20, 2024 (CN) ......................... 202411320174.6

(51) Int. Cl.
*G04F 8/00* (2006.01)
*G04B 19/21* (2006.01)
*G04B 45/00* (2006.01)

(52) U.S. Cl.
CPC ............... *G04F 8/00* (2013.01); *G04B 19/21* (2013.01); *G04B 45/0023* (2013.01); *G04B 45/003* (2013.01); *G04B 45/0061* (2013.01); *G04B 45/0069* (2013.01)

(58) Field of Classification Search
CPC .. G04B 45/0023; G04B 45/006; G04B 19/20; G04B 19/21
See application file for complete search history.

(56) References Cited

U.S. PATENT DOCUMENTS

2023/0124960 A1 * 4/2023 Lederer ................ G04B 19/048 368/222

OTHER PUBLICATIONS

Atowak, Atowak Tarantula (screenshot 1) (Year: 2023).*
Atowak, Atowak Tarantula (screenshot 2) (Year: 2023).*
Harry Winston, Opus 12 Watch Animation (Year: 2012).*

* cited by examiner

*Primary Examiner* — Renee S Luebke
*Assistant Examiner* — Matthew Daniel Hwang

(57) ABSTRACT

The present application provides a timer, including a base, a driving shaft, and an indicator arm. The driving shaft is rotatably mounted on the base and selectably rotates relative to the base. The indicator arm includes a second support and a plurality of hour blocks. The second support is rotatably connected to the driving shaft. The hour blocks each include a second block body and a second gear. The second block body is rotatably connected to the second support. The second gear is fixedly connected to the second block body. Second protrusion is correspondingly arranged on a rotation path of the second gear around the driving shaft. The second gear has second tooth grooves. The second protrusion selectably extends into the second tooth grooves to drive the second gear to rotate relative to the second support so as to drive the hour blocks to rotate relative to the second support.

9 Claims, 6 Drawing Sheets

TIMER

CROSS-REFERENCE TO RELATED APPLICATIONS

The application claims priority of Chinese patent application CN2024113201746, filed on Sep. 20, 2024, which is incorporated herein by reference in its entireties.

TECHNICAL FIELD

The present application relates to the field of time measurement devices, and in particular, to a timer.

BACKGROUND

As a timing tool, a timer is widely used. There are many types of timer, such as a clock, a mechanical watch, and an electronic watch. To perform accurate timing, the existing timer often uses a minute hand and a second hand to display time. However, a user needs to read corresponding to the numbers on a dial, and since a mechanical structure is relatively complex, a timing error easily occurs. If an electronic digital display mode is used, it is necessary to use a battery for power supply, the battery needs to be replaced frequently or charged, and it is very cumbersome for long-time use.

SUMMARY

On such basis, it is necessary to provide a timer to solve at least one of the above problems.

The present application provides a timer, including:

a base;

a driving shaft, rotatably mounted on the base, and selectably rotating relative to the base; and an indicator arm, including a second support and a plurality of hour blocks, wherein the second support is rotatably connected to the driving shaft, the hour blocks each include a second block body and a second gear, the second block body is rotatably connected to the second support, the second gear is fixedly connected to the second block body, the second gear selectably rotates around the driving shaft, at least one second protrusion is correspondingly arranged on a rotation path of the second gear around the driving shaft, the second gear has second tooth grooves, and the second protrusion selectably extends into the second tooth grooves to drive the second gear to rotate relative to the second support so as to drive the hour blocks to rotate relative to the second support.

Further, a number of the hour blocks is 2.

Further, the second support includes second shafts and second hollows, the hour blocks are provided with second shaft holes corresponding to the second shafts, the second shafts penetrate through the second shaft holes and are fixed in the second hollows, and the hour blocks are rotatably connected to the second shafts through the second shaft holes.

Further, the second block body has a plurality of second digital surfaces arranged around the second shafts, and a projection of the plurality of second digital surfaces on a plane perpendicular to an axial direction of the second shaft is a regular hexagon.

Further, the base includes a base plate and a carrier plate, the carrier plate is slidably connected to the base plate, the indicator arm is fixed to the carrier plate, and the carrier plate selectably slides on a surface of the base plate around the driving shaft.

Further, the indicator arm includes first connection columns, the carrier plate has first grooves, the first connection columns are clamped to the first grooves, and the indicator arm is fixed to the carrier plate through the first connection columns.

Further, the timer further includes a dial, wherein the dial is fixedly connected to the base, the dial includes minute blocks and a first support, the first support includes a first hollow arranged corresponding to the minute blocks, and the minute blocks are located in the first hollow and rotatably connected to the first support.

Further, the first support further includes first shafts arranged corresponding to the minute blocks, the first support further has third shaft holes, the first shafts are fixedly connected to the third shaft holes, and the minute blocks are rotatably connected to the first shafts.

Further, the minute blocks each include a first block body and a first gear, the first block body is rotatably connected to the first support, the first gear is fixedly connected to the first block body, the first gear selectably moves relative to the base, at least one first protrusion is arranged on a movement path of the first gear relative to the base, the first gear has first tooth grooves, and the first protrusion selectably extends into the first tooth grooves to drive the first gear to rotate relative to the first support so as to drive the first block body to rotate relative to the first support.

Further, the first support further includes a first through hole corresponding to the indicator arm, and the indicator arm is located in the first through hole.

The above timer displays time through the numbers, so that it is convenient for a user to read; the structure is simple, so that a timing error does not easily occur; it is not necessary to use a battery for power supply, so that it is convenient for the user to use for long time.

BRIEF DESCRIPTION OF THE DRAWINGS

The drawings are only used for exemplary description and shall not be construed as limiting the present patent; the same reference signs are used for components with the same structure and function. In the drawings.

DESCRIPTIONS OF THE REFERENCE SIGNS

Figure 1:
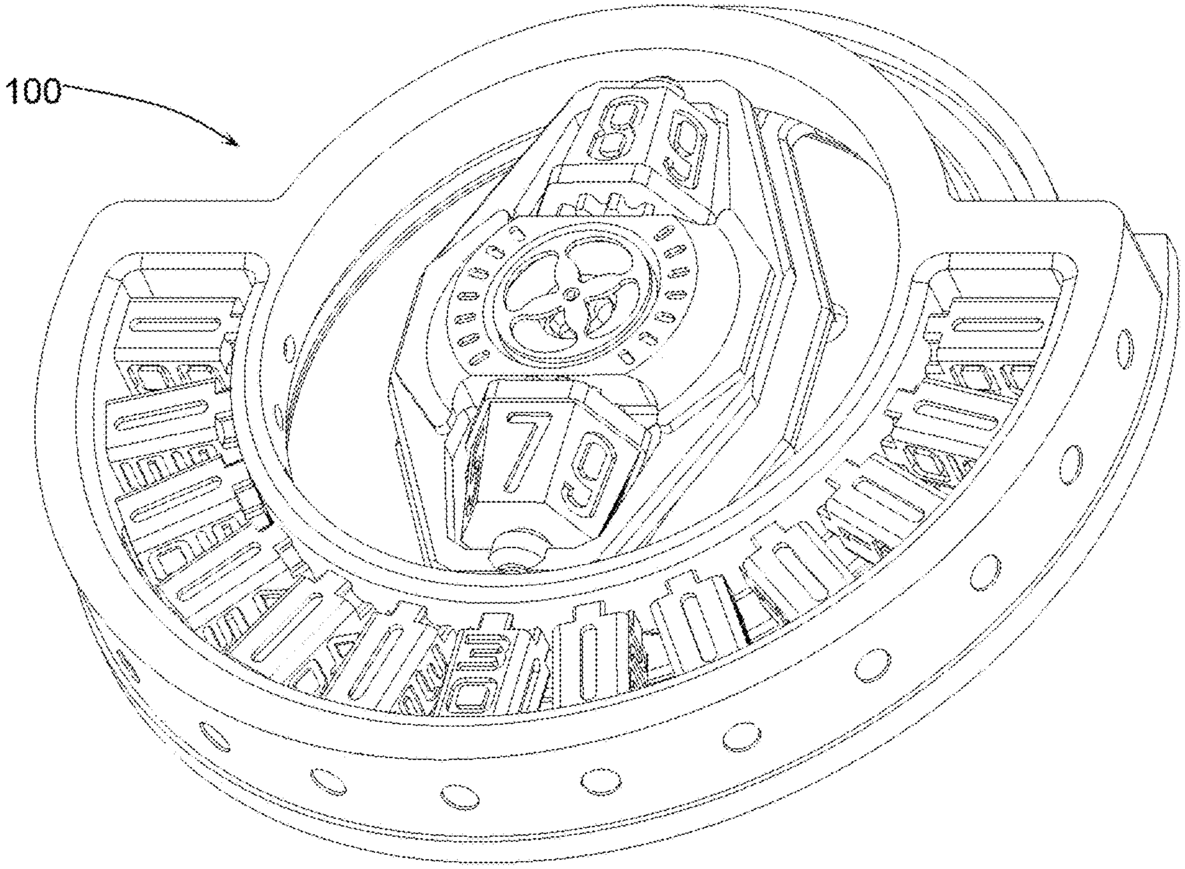
FIG. 1 is a schematic overall structural diagram of a timer according to one embodiment of the present application.
Figure 2:
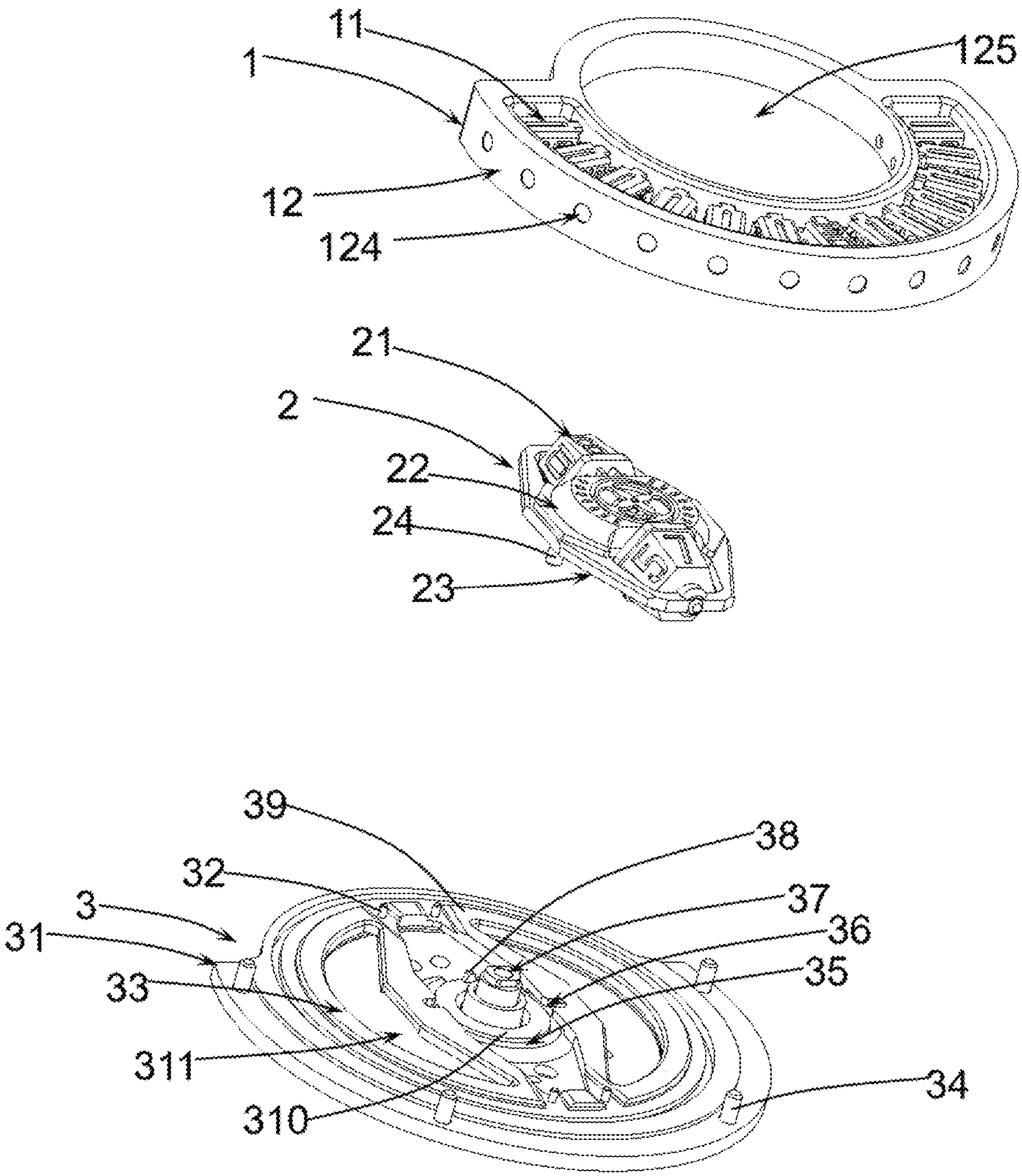
FIG. 2 is a schematic exploded structural diagram of a timer according to one embodiment of the present application.
Figure 3:
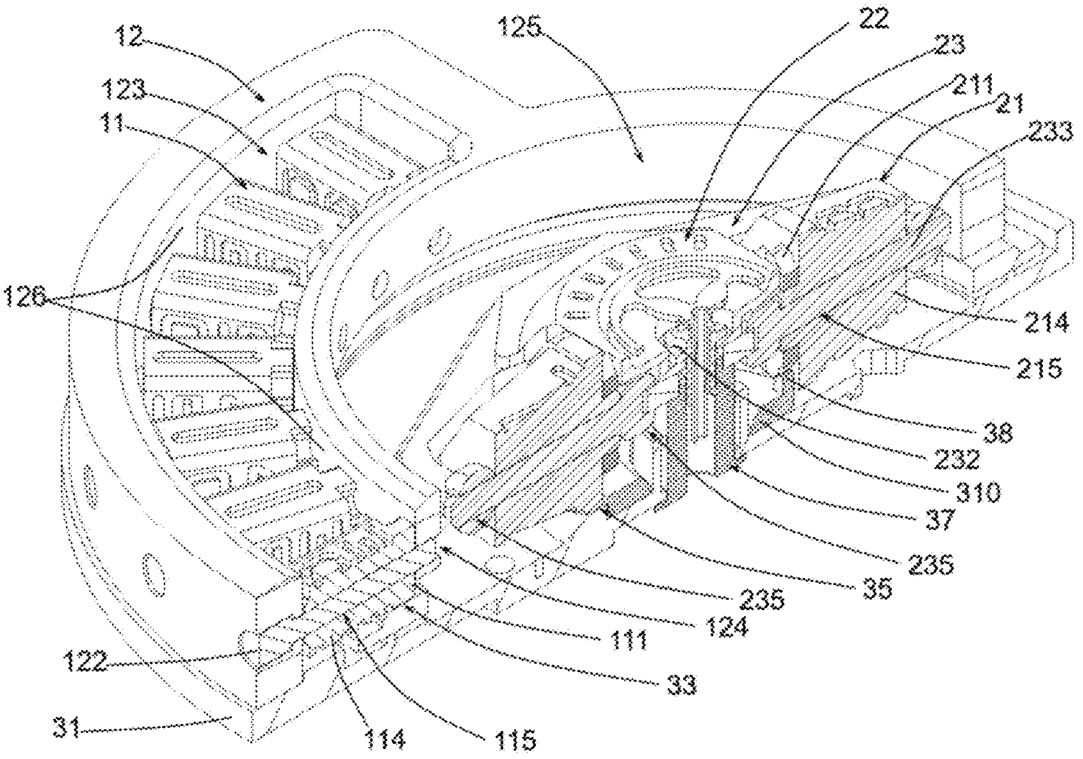
FIG. 3 is a schematic sectional structural diagram of a timer according to one embodiment of the present application.
Figure 4:
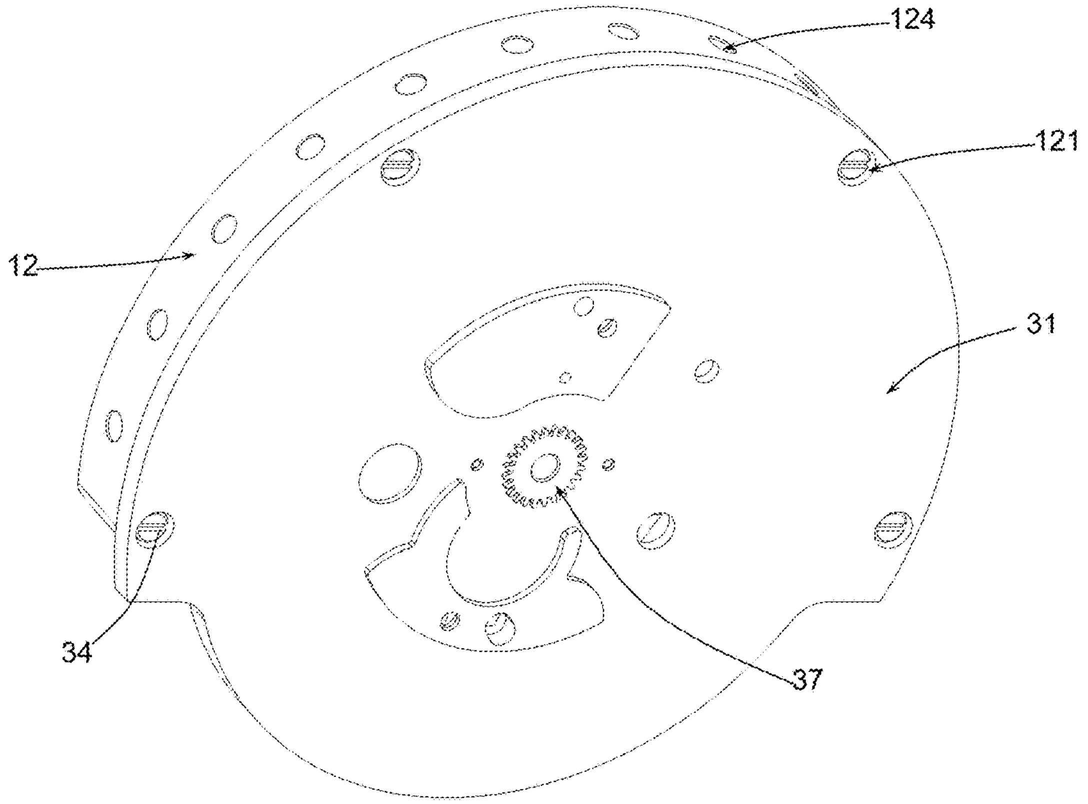
FIG. 4 is a schematic overall structural diagram of a timer according to another embodiment of the present application.
Figure 5:
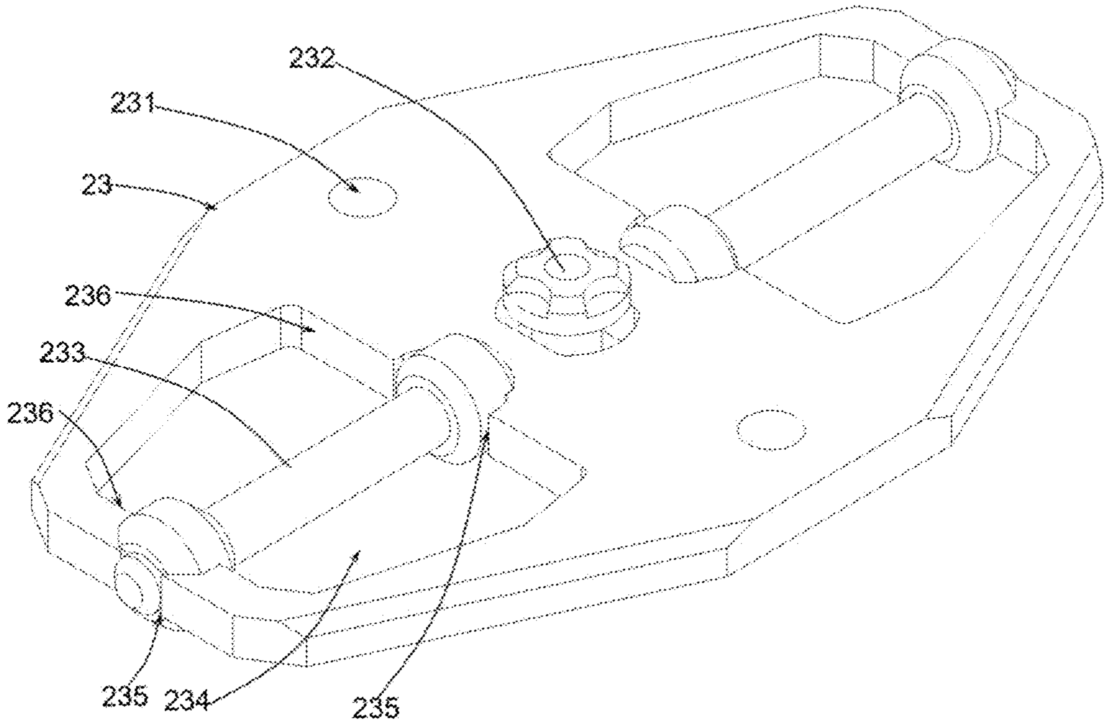
FIG. 5 is a schematic overall structural diagram of a second support according to one embodiment of the present application.
Figure 6:
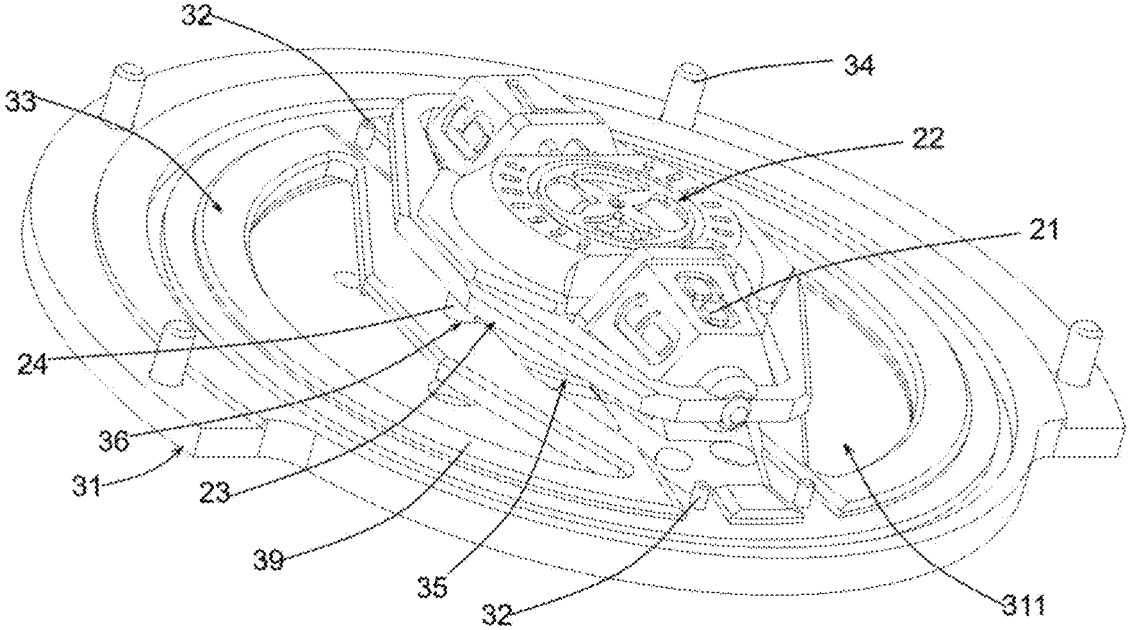
FIG. 6 is a schematic assembly structural diagram of a base and an indicator arm according to one embodiment of the present application.
Figure 7:
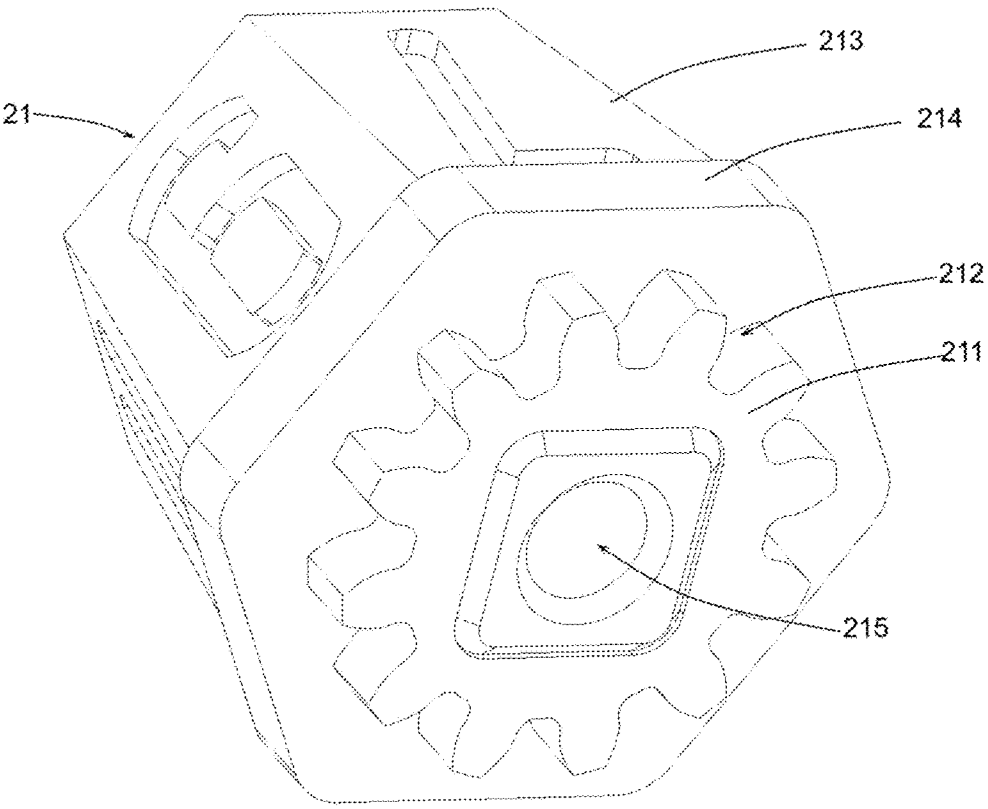
FIG. 7 is a schematic overall structural diagram of an hour block according to one embodiment of the present application.
Figure 8:
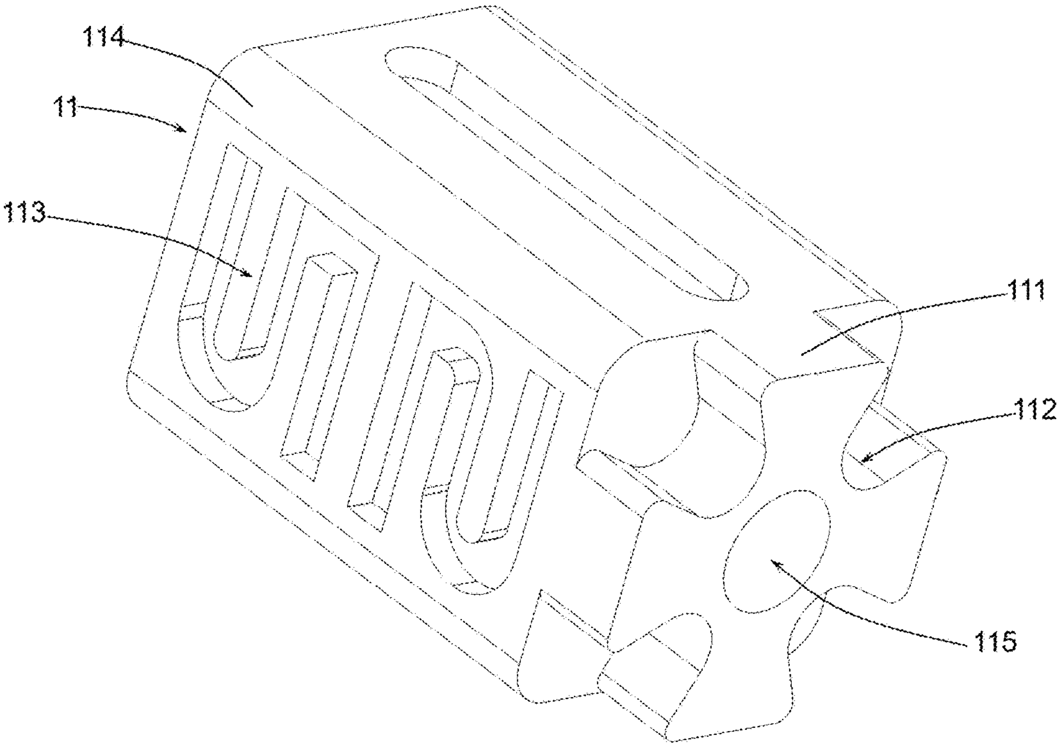
FIG. 8 is a schematic overall structural diagram of a minute block according to one embodiment of the present application.

Timer—100
Dial—1
Minute block—11
First gear—111
First tooth groove—112
First digital surface—113
First block body—114
First shaft hole—115
First support—12
First mounting hole—121
First shaft—122
First hollow—123
Third shaft hole—124
First through hole—125
First inner wall—126
Indicator arm—2
Hour block—21
Second gear—211
Second tooth groove—212
Second digital surface—213
Second block body—214
Second shaft hole—215
Cap assembly—22
Second support—23
Second mounting hole—231
First fastener—232
Second shaft—233
Second hollow—234
Clamping opening—235
Second inner wall—236
First connection column—24
Base—3
Base plate—31
Groove—311
First protrusion—32
First guiding surface—33
Second connection column—34
Second guiding surface—35
First groove—36
Driving shaft—37
Second protrusion—38
Carrier plate—39
Guiding ring—310

DETAILED DESCRIPTION OF THE EMBODIMENTS

The technical solutions in the embodiments of the present application will be described below in combination with the drawings in the embodiments of the present application. In the description of the embodiments of the present application, unless otherwise stated, "/" means or, for example, A/B may represent A or B; "and/or" herein is merely a description of the association relationship of associated objects, representing that three types of relationships may exist, such as A and/or B, which can represent the three situations: the presence of A alone, the presence of A and B simultaneously, and the presence of B alone. In addition, in the description of the embodiments of the present application, "a plurality of" refers to two or more than two.

Hereinafter, the terms "first" and "second" are used merely for descriptive purposes, and cannot be understood as indicating or implying relative importance or implicitly specifying the number of indicated technical features. Thus, the features defined with "first" and "second" may explicitly or implicitly include one or more of the features.

In the description of the embodiments of the present application, unless otherwise stated, "a plurality of" means two or more than two.

Please refer to FIG. 1-FIG. 8, an embodiment of the present application provides a timer 100, including a dial 1, an indicator arm 2, and a base 3, and both the dial 1 and the indicator arm 2 are mounted on the base 3.

In this embodiment, the base 3 includes a base plate 31, and the base plate 31 is mainly used for supporting and mounting components and parts of the timer 100.

In this embodiment, the base 3 further includes a carrier plate 39, the base plate 31 has a groove 311 fitting an outer contour of the carrier plate 39, and the carrier plate 39 is mounted in the groove 311.

In this embodiment, the base 3 further includes a driving shaft 37, a middle of the base plate 31 has a through hole, one end of the driving shaft 37 is fixed to the through hole, and the carrier plate 39 selectably rotates around the driving shaft 37 under the guidance of the groove 311.

In this embodiment, a gear is fixed to one end of the driving shaft 37, and a power source, such as a motor, drives the driving shaft 37 to rotate through the gear so as to provide a driving force for the driving shaft 37. It can be understood that, in some embodiments, a power source may be of other types, and a gear may also be changed into other transmission forms, as long as the driving shaft 37 can be driven to move.

In this embodiment, the indicator arm 2 includes two hour blocks 21 arranged directly opposite to each other, and the hour blocks are used for indicating the number of hours.

In this embodiment, the indicator arm 2 further includes a second support 23 and a cap assembly 22, the second support 23 is arranged corresponding to the driving shaft 37, the position of the second support 23 corresponding to the driving shaft 37 is provided with a through hole, and the other end of the driving shaft 37 penetrates through the through hole and is fixedly connected to the cap assembly 22. In this way, the second support 23 is fixed to the driving shaft 37, and when the driving shaft 37 rotates, the second support 23 rotates along with the driving shaft 37, so that the indicator arm 2 rotates along with the driving shaft 37.

In this embodiment, the second support 23 includes a first fastener 232, and the other end of the driving shaft 37 is fixedly connected to the driving shaft 37 through the first fastener 232. Specifically, the first fastener 232 may be, but is not limited to, a screw, a bolt, or a rivet. In this way, the second support 23 is stably and fixedly connected to the driving shaft 37.

In this embodiment, the indicator arm 2 includes two first connection columns 24 which are oppositely arranged, and both the two first connection columns 24 are located at one side of the second support 23 facing the carrier plate 39 and distributed at two sides of the hour blocks 21.

In this embodiment, the second support 23 further includes two second mounting holes 231, the two second mounting holes 231 are arranged respectively corresponding to the two first connection columns 24, and the two first connection columns 24 are respectively clamped into the two second mounting holes 231. In this way, the first connection columns 24 are fixedly connected to the second support 23.

In this embodiment, the positions of the carrier plate 39 corresponding to the two first connection columns 24 respectively have one first groove 36, and the first connection columns 24 are accommodated in the first grooves 36. In this way, the second support 23 can rotate along with the rotation of the carrier plate 39 under the pushing of the first grooves 36.

In this embodiment, the second support 23 includes two second hollows 234 distributed at two sides of the cap assembly 22 and oppositely arranged, and two second shafts 233, the two second hollows 234 correspond to the two hour blocks 21, respectively, the two second shafts 233 are located in the two second hollows 234, respectively, the positions of second inner walls 236 of the second hollow 234 corresponding to two ends of the second shaft 233 respectively have one clamping opening 235, and the two hour blocks 21 are also located in the two second hollows 234, respectively and are rotatably mounted on the corresponding second shafts 233. Specifically, the hour block 21 is provided with a second shaft hole 215 corresponding to the second shaft 233, one end of the second shaft 233 is clamped to the corresponding clamping opening 235, and the other end of the second shaft 233 penetrates through the second shaft hole 215 and is clamped to the corresponding clamping opening 235. In this way, the second shafts 233 are fixedly connected to the second inner walls 236 of the second hollows 234, the hour blocks 21 are rotatably connected to the second shafts 233, and when the second support 23 rotates along with the driving shaft 37, the hour blocks 21 rotate around the driving shaft 37.

In this embodiment, the hour block 21 includes a second gear 211 and a second block body 214, the second gear 211 is fixed to the second block body 214, and both the second block body 214 and the second gear 211 are rotatably connected to the second shaft 233. In this way, the second gear 211 rotates around the second shaft 233 so as to drive the hour block 21 to rotate around the second shaft 233.

In this embodiment, the position of the base 3 close to the rotation path of the second gear 211 is correspondingly provided with a guiding ring 310, and the guiding ring 310 has a second guiding surface 35 arranged close to and along the rotation path of the second gear 211.

In this embodiment, the second guiding plane 35 has a second protrusion 38 located on the rotation path of the second gear 211, the second gear 211 has a plurality of second tooth grooves 212, and when the second gear 211 rotates around the driving shaft 37 and passes through the second protrusion 38, the second protrusion 38 extends into the second tooth groove 212 which faces and is closest to the second protrusion 38. In this way, under the driving of the rotational motion of the second gears 211 around the driving shaft 37, the second gears 211 rotate around the second shafts 233 so as to drive the hour blocks 21 to rotate as a whole around the second shafts 233.

In this embodiment, the second block body 214 has second digital surfaces 213, and the second digital surfaces 213 are engraved with the number of hours. In this way, the hour block 21 can be used for indicating the number of hours.

In this embodiment, the projection of the hour block 21 on the plane perpendicular to the axial direction of the second shaft 233 is a regular hexagon, the hour block 21 has only six second digital surfaces 213, the six second digital surfaces 213 of one of the two hour blocks 21 are engraved with the number of hours, i.e., 1, 3, 5, 7, 9, and 11, respectively, and the six second digital surfaces 213 of the other one are engraved with the number of hours, i.e., 2, 4, 6, 8, 10, 12, respectively.

In this embodiment, the dial 1 includes thirteen minute blocks 11, the thirteen minute blocks 11 are used for indicating the number of minutes, i.e., 00, 05, 10, 15, 20, 25, 30, 35, 40, 45, 50, 55, and 00, respectively, the thirteen minute blocks 11 are distributed in a semicircular shape around the indicator arm 2 and form a semicircular area for displaying minutes, and the second protrusion 38 is located at the opposite side directly opposite to the minute block 11 for indicating the number of minutes, i.e., 30.

In this embodiment, the dial 1 further includes a first support 12, the first support 12 has first mounting holes 121, the base plate 31 is provided with second connection columns 34 corresponding to the first mounting holes 121, and the second connection columns 34 are clamped into the first mounting holes 121. In this way, the first support 12 is fixedly connected to the base plate 31.

In this embodiment, the first support 12 includes a first through hole 125 arranged corresponding to the indicator arm 2, and the indicator arm 2 is located in the first through hole 125. In this way, the indicator arm 2 can have enough space to rotate along with the driving shaft 37.

In this embodiment, the first support 12 further includes a first hollow 123 arranged along the peripheral direction of the first through hole 125 and corresponding to the minute blocks 11, and thirteen first shafts 122 arranged respectively corresponding to the thirteen minute blocks 11, all the thirteen first shafts 122 are located in the first hollow 123, the positions of first inner walls 126 of the first hollow 123 corresponding to two ends of the first shaft 122 respectively have one third shaft hole 124, and all the thirteen minute blocks 11 are also located in the first hollow 123 and are rotatably mounted on the corresponding first shafts 122, respectively. Specifically, the minute block 11 is provided with a first shaft hole 115 corresponding to the first shaft 122, one end of the first shaft 122 is clamped to the corresponding third shaft hole 124, and the other end of the first shaft 122 penetrates through the first shaft hole 115 and is clamped to the corresponding third shaft hole 124. In this way, the first shafts 122 are fixedly connected to the first inner walls 126 of the first hollow 123, and the minute blocks 11 are rotatably connected to the first shafts 122.

In this embodiment, the minute block 11 includes a first gear 111 and a first block body 114, the first gear 111 is fixed to the first block body 114, and both the first block body 114 and the first gear 111 are rotatably connected to the first shaft 122. In this way, the first gear 111 rotates around the first shaft 122 so as to drive the first block body 114 to rotate around the first shaft 122.

In this embodiment, one side of the carrier plate 39 facing the first gear 111 has a first guiding surface 33 close to and directly opposite the first gear 111, the first guiding surface 33 is in an annular shape and extends along the distribution direction of the first gear 111, one side of the annular first guiding surface 33 corresponding to one of the hour blocks 21 has a pair of adjacent first protrusions 32, one side of the annular first guiding surface 33 corresponding to the other hour block 21 has another pair of adjacent first protrusions 32, and by adjusting the angle of rotation of the carrier plate 39, the two adjacent first protrusions 32 can be adjusted to correspond to any two adjacent first gears 111 of the thirteen first gears 111.

In this embodiment, the first gear 111 has a plurality of first tooth grooves 112, and when the first protrusions 32 rotate around the driving shaft 37 along with the carrier plate 39 and pass through the first gears 111, the first protrusions 32 extend into the first tooth grooves 112 which face and are closest to the first guiding surface 33. In this way, under the driving of the rotational motion of the carrier plate 39 around the driving shaft 37, the first gears 111 rotate around the first shafts 122 so as to drive the minute blocks 11 to rotate as a whole around the first shafts 122.

In this embodiment, the projection of the minute block 11 on the plane perpendicular to the axial direction of the first shaft 122 is a square, the minute block 11 has four first digital surfaces 113, and two opposite first digital surfaces 113 of the four first digital surfaces 113 are engraved with the same number of minutes. In this way, the minute blocks 11 can be used for indicating the number of minutes.

Figure 9:
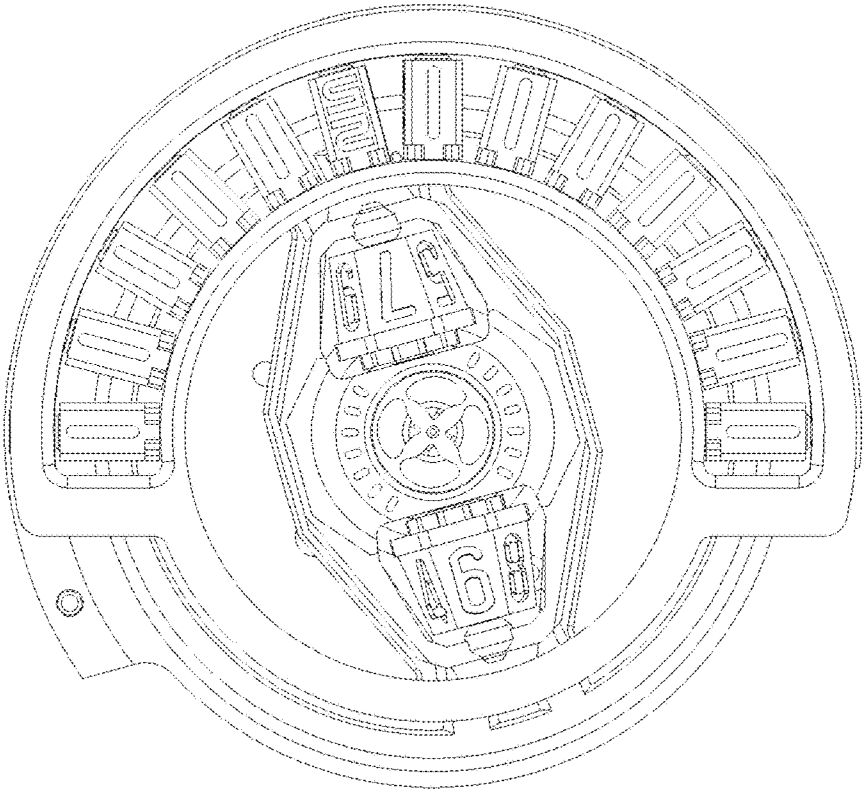
FIG. 9 is a schematic diagram of a use state of a timer according to one embodiment of the present application.
Figure 10:
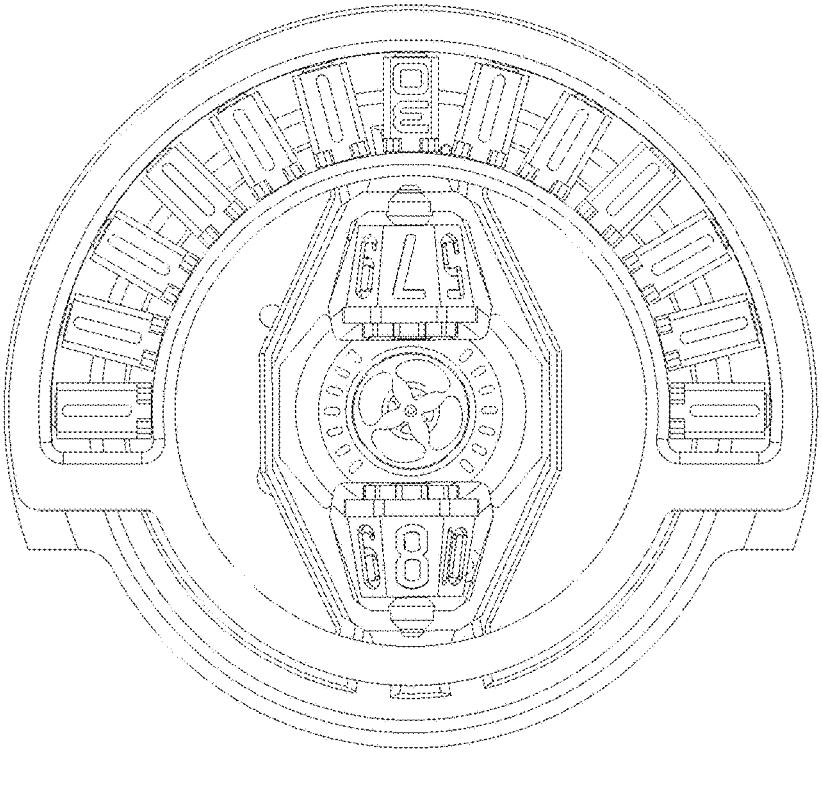
FIG. 10 is a schematic diagram of a use state of a timer according to another embodiment of the present application.

Please refer to FIG. 9 and FIG. 10, during use, when the hour block 21 indicating the number of hours, i.e., n, rotates into the semicircular area for displaying minutes from near the minute block 11 indicating the number of minutes, i.e., 00, at the start position of the semicircular area for displaying minutes, the other hour block 21 arranged directly opposite to the hour block 21 indicating the number of hours, i.e., n, indicates the number of hours, i.e., n−1; under the action of the driving shaft 37, the indicator arm 2 rotates along with the driving shaft 37 to drive the carrier plate 39 fixed to the second support 23 to rotate, a pair of adjacent first protrusions 32 corresponding to the hour block 21 indicating the number of hours, i.e., n, rotate along with the carrier plate 39, and when the hour block 21 indicating the number of hours, i.e., n, rotates to gradually point to the minute block 11 indicating the number of minutes, i.e., mm, one of the pair of adjacent first protrusions 32 gradually extends into the first tooth groove 112 of the first gear 111 corresponding to the minute block 11 indicating the number of minutes, i.e., mm, and dials the first gear 111 to rotate until the first digital surface 113 corresponding to the minute block 11 faces upwards, so that the minute block 11 indicates the number of minutes, i.e., mm; the other one of the pair of adjacent first protrusions 32 gradually extends into the first tooth groove 112 of the first gear 111 corresponding to the preceding minute block 11 indicating the number of minutes, i.e., mm−5, adjacent to the minute block 11 indicating the number of minutes. i.e., mm, so that the minute block 11 indicating the number of minutes, i.e., mm−5, is rotated to make the surface with the displayed number being empty corresponding to the minute block 11 face upwards, thereby making the indicated number of minutes empty. In this way, it is possible to always keep the first digital surface 113 of only one of the minute blocks 11 facing upwards, and to keep the surfaces of the rest of the minute blocks 11 with the displayed numbers being empty facing upwards. When the hour block 21 indicating the number of hours, i.e., n, rotates to be directly opposite to the minute block 11 indicating the number of minutes, i.e., 30, the other hour block 21 indicating the number of hours, i.e., n−1, arranged directly opposite to the hour block 21 indicating the number of hours, i.e., n, just rotates to the position where the second protrusion 38 arranged directly opposite thereto at the opposite side is located, at this time, the hour block 21 is driven by the trend of the rotational motion thereof around the driving shaft 37, the second gear 211 rotates around the second shaft 233 so as to drive the hour block 21 to rotate as a whole around the second shaft 233, so that the hour block 21 indicates the number of hours, i.e., n+1; when the hour block 21 indicating the number of hours, i.e., n, rotates away from the semicircular area for displaying minutes from near the minute block 11 indicating the number of minutes, i.e., 00, at the end position of the semicircular area for displaying minutes, the hour block 21 indicating the number of hours, i.e., n+1, just rotates into the semicircular area for displaying minutes from near the minute block 11 indicating the number of minutes, i.e., 00, at the start position of the semicircular area for displaying minutes.

The above timer 100 displays time through the numbers, so that it is convenient for a user to read; the structure is simple, so that a timing error does not easily occur; it is not necessary to use a battery for power supply, so that it is convenient for the user to use for long time; whichever minute block 11 the indicator arm 2 points to displays the indicated number of minutes and the rest of the minute blocks 11 display empty, so that the enjoyment of use by the user is increased; the first connection columns 24 of the indicator arm 2 are only accommodated in the first grooves 36 on the carrier plate 39 but the carrier plate 39 does not bear the weight of the indicator arm 2 in the direction of gravity, so that the bearing of the driving shaft 37 can be reduced, thereby increasing the reliability of driving of the driving shaft 37; one end of the second shaft 233 is clamped to the corresponding clamping opening 235 in a wedged manner like a mortise and tenon structure, so that the problem can be avoided that screws are easily disengaged in the scheme of screw connection, thereby increasing the reliability of connection.

It is apparent to those skilled in the art that the present application is not limited to the details of the above exemplary embodiments, and can be embodied in other specific forms without departing from the spirit or essential characteristics of the present application. Therefore, from any point, the embodiments should be considered exemplary and not restrictive, and the scope of the present application is defined by the appended claims rather than the above description, and thus, all changes that come within the meaning and range of equivalence of the claims are intended to be embraced therein. Any reference sign in the claims should not be regarded as limiting the claims involved. The above content is only a specific implementation of the present application, but the scope of protection of the present application is not limited thereto. Any changes or replacements within the technical scope disclosed by the present application should fall within the scope of protection of the present application. Therefore, the scope of protection of the present application should be subject to the scope of protection of the claims.

What is claimed is:

1. A timer, comprising:

a base;

a dial, fixedly connected to the base, and comprising minute blocks and a first support;

a driving shaft, rotatably mounted on the base, and selectably rotating relative to the base; and an indicator arm, comprising a second support and a plurality of hour blocks, wherein the first support comprises a first hollow arranged corresponding to the minute blocks, and the minute blocks are located in the first hollow and rotatably connected to the first support;

the second support is rotatably connected to the driving shaft, the hour blocks each comprise a second block body and a second gear, the second block body is rotatably connected to the second support, the second gear is fixedly connected to the second block body, the second gear selectably rotates around the driving shaft, at least one second protrusion is correspondingly arranged on a rotation path of the second gear around the driving shaft, the second gear has second tooth grooves, and the second protrusion selectably extends into the second tooth grooves to drive the second gear to rotate relative to the second support so as to drive the hour blocks to rotate relative to the second support.

2. The timer according to claim 1, wherein a number of the hour blocks is 2.

3. The timer according to claim 1, wherein the second support comprises second shafts and second hollows, the hour blocks are provided with second shaft holes corresponding to the second shafts, the second shafts penetrate through the second shaft holes and are fixed in the second hollows, and the hour blocks are rotatably connected to the second shafts through the second shaft holes.

4. The timer according to claim 3, wherein the second block body has a plurality of second digital surfaces arranged around the second shafts, and a projection of the plurality of second digital surfaces on a plane perpendicular to an axial direction of the second shaft is a regular hexagon.

5. The timer according to claim 1, wherein the base comprises a base plate and a carrier plate, the carrier plate is slidably connected to the base plate, the indicator arm is fixed to the carrier plate, and the carrier plate selectably slides on a surface of the base plate around the driving shaft.

6. The timer according to claim 5, wherein the indicator arm comprises first connection columns, the carrier plate has first grooves, the first connection columns are clamped to the first grooves, and the indicator arm is fixed to the carrier plate through the first connection columns.

7. The timer according to claim 1, wherein the first support further comprises first shafts arranged corresponding to the minute blocks, the first support further has third shaft holes, the first shafts are fixedly connected to the third shaft holes, and the minute blocks are rotatably connected to the first shafts.

8. The timer according to claim 7, wherein the minute blocks each comprise a first block body and a first gear, the first block body is rotatably connected to the first support, the first gear is fixedly connected to the first block body, the first gear selectably moves relative to the base, at least one first protrusion is arranged on a movement path of the first gear relative to the base, the first gear has first tooth grooves, and the first protrusion selectably extends into the first tooth grooves to drive the first gear to rotate relative to the first support so as to drive the first block body to rotate relative to the first support.

9. The timer according to claim 1, wherein the first support further comprises a first through hole corresponding to the indicator arm, and the indicator arm is located in the first through hole.

* * * * *